(12) United States Patent
Bhatia et al.

(10) Patent No.: US 12,217,322 B2
(45) Date of Patent: *Feb. 4, 2025

(54) PROPERTY ENHANCEMENT ANALYSIS

(71) Applicant: Wells Fargo Bank, N.A., San Francisco, CA (US)

(72) Inventors: Ankush Bhatia, Waukee, IA (US); Ricky Alan Brame, Des Moines, IA (US); Wesley Damon Brown, West Des Moines, IA (US); Jan M. Emter, Minneapolis, MN (US); Paul Ferguson, Adel, IA (US); Scott Curtis Grengs, Lakeville, MN (US); Dan R. Grizzle, Clive, IA (US); Dale Steven Howard, Clive, IA (US); Basil F. Nimry, Des Moines, IA (US); Suhas Dattatreya Sankolli, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,406

(22) Filed: Sep. 14, 2023

(65) Prior Publication Data
US 2024/0005424 A1 Jan. 4, 2024

Related U.S. Application Data

(63) Continuation of application No. 17/399,552, filed on Aug. 11, 2021, now Pat. No. 11,798,109, which is a (Continued)

(51) Int. Cl.
G06Q 50/16 (2024.01)
G06Q 30/0283 (2023.01)
(Continued)

(52) U.S. Cl.
CPC ......... *G06Q 50/16* (2013.01); *G06Q 30/0283* (2013.01); *G06Q 30/0643* (2013.01); *G06T 19/006* (2013.01)

(58) Field of Classification Search
None
See application file for complete search history.

(56) References Cited

U.S. PATENT DOCUMENTS 6,922,701 B1   7/2005 Ananian et al.
7,062,722 B1   6/2006 Carlin et al.
(Continued)

FOREIGN PATENT DOCUMENTS

AU   2015101646 A4   12/2015
CN      105278663 A    1/2016
(Continued)

OTHER PUBLICATIONS

West, "SierraHome Announces Custom Home 3D Design 4.0", http://www.gamezone.com/news/sierrahome_announces_custom_home_3d_design_4_0, Sep. 27, 2011, 1 page.
(Continued)

*Primary Examiner* — Paul R Fisher
(74) *Attorney, Agent, or Firm* — Merchant & Gould P.C.

(57) ABSTRACT

An example system is configured for displaying enhancement options and financial analysis. The system may include a server, third party data sources and an augmented reality computing device that includes a processing unit and system memory. The augmented reality computing device is configured to obtain user input regarding a property enhancement option; render the property enhancement options in augmented reality; obtain financial data from the server and the third party data sources; responsive to the obtained user input, automatically generate a financial analysis of the property enhancement option, wherein the financial analysis
(Continued)

is based on the obtained financial data; and render the financial analysis with the obtained property enhancement option in augmented reality.

20 Claims, 7 Drawing Sheets

Related U.S. Application Data continuation of application No. 15/802,806, filed on Nov. 3, 2017, now Pat. No. 11,120,515.

(51) Int. Cl.
*G06Q 30/0601* (2023.01)
*G06T 19/00* (2011.01)

(56) References Cited

U.S. PATENT DOCUMENTS

| | | | |
|---|---|---|---|
| 7,277,572 | B2 | 10/2007 | Macinnes et al. |
| 8,606,657 | B2 | 12/2013 | Chesnut et al. |
| 9,652,897 | B2 | 5/2017 | Osborn et al. |
| 9,978,109 | B1 | 5/2018 | Catalano |
| 10,052,026 | B1* | 8/2018 | Tran ................ A61B 5/165 |
| 10,311,614 | B2 | 6/2019 | Mowatt |
| 2001/0032062 | A1 | 10/2001 | Plaskoff et al. |
| 2002/0010655 | A1 | 1/2002 | Kjallstrom |
| 2002/0099617 | A1 | 7/2002 | Fogelson |
| 2003/0052877 | A1 | 3/2003 | Schwegler, Jr. et al. |
| 2003/0144936 | A1 | 7/2003 | Sloan et al. |
| 2006/0080114 | A1 | 4/2006 | Bakes et al. |
| 2006/0089895 | A1 | 4/2006 | Joye et al. |
| 2006/0149687 | A1 | 7/2006 | Mclemore |
| 2006/0190285 | A1 | 8/2006 | Harris et al. |
| 2007/0250386 | A1 | 10/2007 | Wyckoff |
| 2008/0103908 | A1 | 5/2008 | Munk |
| 2008/0162224 | A1 | 7/2008 | Coon et al. |
| 2009/0024628 | A1 | 1/2009 | Angel et al. |
| 2009/0070167 | A1 | 3/2009 | Benad et al. |
| 2011/0178906 | A1 | 7/2011 | Joye et al. |
| 2011/0202446 | A1 | 8/2011 | Kremen |
| 2011/0214082 | A1 | 9/2011 | Osterhout et al. |
| 2012/0249588 | A1 | 10/2012 | Tison et al. |
| 2012/0299963 | A1 | 11/2012 | Wegrzyn et al. |
| 2013/0036371 | A1 | 2/2013 | Cohen |
| 2013/0311401 | A1 | 11/2013 | Clary |
| 2014/0058961 | A1 | 2/2014 | Mcdaniel et al. |
| 2014/0063063 | A1 | 3/2014 | Scott et al. |
| 2014/0095122 | A1 | 4/2014 | Appleman et al. |
| 2014/0129948 | A1 | 5/2014 | Jones et al. |
| 2014/0222608 | A1 | 8/2014 | Cohen et al. |
| 2014/0310595 | A1 | 10/2014 | Acharya et al. |
| 2014/0313226 | A1 | 10/2014 | Feiner et al. |
| 2015/0012426 | A1 | 1/2015 | Purves et al. |
| 2015/0052080 | A1 | 2/2015 | Letzeiser |
| 2015/0178861 | A1 | 6/2015 | Gordon et al. |
| 2015/0242747 | A1 | 8/2015 | Packes et al. |
| 2015/0248724 | A1 | 9/2015 | Snell et al. |
| 2015/0316985 | A1 | 11/2015 | Levesque et al. |
| 2015/0324940 | A1 | 11/2015 | Samson et al. |
| 2016/0027051 | A1 | 1/2016 | Gross |
| 2016/0092891 | A1 | 3/2016 | Flett |
| 2016/0098727 | A1 | 4/2016 | Carlson et al. |
| 2016/0148433 | A1 | 5/2016 | Petrovskaya et al. |
| 2016/0210602 | A1 | 7/2016 | Siddique et al. |
| 2016/0378887 | A1 | 12/2016 | Maldonado |
| 2017/0046878 | A1 | 2/2017 | Dobslaw |
| 2017/0076365 | A1 | 3/2017 | D'Souza et al. |
| 2017/0132841 | A1 | 5/2017 | Morrison |
| 2017/0323378 | A1 | 11/2017 | Dintenfass et al. |
| 2018/0068474 | A1 | 3/2018 | Mowatt |
| 2019/0228553 | A1 | 7/2019 | Mowatt |

FOREIGN PATENT DOCUMENTS

| | | |
|---|---|---|
| WO | 2015020703 A1 | 2/2015 |
| WO | 2015139086 A1 | 9/2015 |

OTHER PUBLICATIONS

Lowe's Holoroom, Virtual Reality fAor Retail—VisualCommerce, http://www.marxentlabs.com/ar-videos/lowes-holoroom-3d-augmented-reality-virtual-room-home-improvement/, 2014, 5 pages.
Wang et al., "Integrating BIM and augmented reality for interactive architecture visualization," Construction Innovation, Apr. 14, 2014, 16 pages.
Furlonger et al., "Survey Analysis: Financial Services CIOs Should Not Ignore the Internet of Things," Mar. 17, 2015, 17 pages.
Furlonger et al., "Toolkit: IoT Strategic Technology Map for Financial Services Initiatives," Dec. 2, 2015, 4 pages.
Moyer et al., "Measuring the Strategic Value of Financial Services IoT," Dec. 2, 2015, 10 pages.
Burke et al., "Top 10 Strategic Technology Trends for 2016: Internet of Things Architecture and Platforms," Feb. 19, 2016, 11 pages.
Cearley et al., "Top 10 Strategic Technology Trends for 2016: Ambient User Experience," Feb. 26, 2016, 11 pages.
Cearley et al., "Top 10 Strategic Technology Trends for 2016," Feb. 29, 2016, 15 pages.
Friedman et al., "Predicts 2016: Unexpected Implications Arising From the Internet of Things," Dec. 3, 2015, 13 pages.
Geschickter et al., "Measuring the Strategic Value of the Internet of Things for Industries," Apr. 28, 2016, 14 pages.
Geschickter et al., "Survey Analysis: Early Adopters of Internet of Things Poised to Make 2016 the Year of the Customer," Feb. 12, 2016, 15 pages.
Lehong et al., "Building a Digital Business Technology Platform," Jun. 8, 2016, 21 pages.
Moyer et al., "Industry Vision: Tipping Point for Banks as Platforms," May 3, 2016, 11 pages.
Moyer, Kristin R., "Industry Vision: Banks as Platforms," Apr. 22, 2016, 11 pages.
Moyer, Kristin R., "The Economics of Connections for Banking," Mar. 8, 2016, 12 pages.
Newton et al., "Gartner's Digital Banking Customer Advisory Framework," Jul. 7, 2016, 8 pages.
Plummer et al., "Top Strategic Predictions for 2016 and Beyond: The Future is a Digital Thing," Oct. 2, 2015, 27 pages.
Tully et al., "Internet of Things Primer for 2016," Mar. 31, 2016, 8 pages.
Tully, Jim, "IoT: Key Lessons to Date and Action Plan for 2016," Feb. 12, 2016, 8 pages.
Velosa et al., "Hype Cycle for the Internet of Things, 2016," Jul. 14, 2016, 68 pages.
Velosa et al., "Maturity Model for the Internet of Things," Mar. 2, 2016, 18 pages.
Walker et al., "Top 10 Strategic Technology Trends for 2016: Information of Everything," Feb. 26, 2016, 11 pages.
Denman, Selina, "Facing the future: virtual interior design reality in the home," Reference Location: ProQuest, May 17, 2017, 4 pages.
Jones, Nick, "Top 10 IoT Technologies for 2017 and 2018," Jan. 22, 2016, 12 pages.
Yurieff, Kaya, "This shopping app lets you see a virtual couch in your real living room," http://money.cnn.com/2017/05/03/technology/houzz-3d-augmented-reality-shopping/, May 3, 2017, 4 pages.
Prentice, Stephen, "The Six Forces That Will Shape Business and Technology in 2030," Feb. 1, 2016, 9 pages.
Busta, Hallie, "Three Augmented and Virtual Reality Apps for Design and Construction," http://www.architectmagazine.com/technology/products/three-augmented-and-virtual-reality-apps-for-design-and-construction_o, Aug. 27, 2015, 6 pages.
Cambria, "Envision the Possibilities With Cambria AR™" cambriausa.com [online]. Retrieved from the Internet: <https://www.cambriausa.com/Cambria-AR/>. Retrieved on Oct. 18, 2017, 7 pages.

(56) References Cited

OTHER PUBLICATIONS

Ikea, "The Ikea Home Planner," ikea.com [online]. Retrieved from the Internet: <http://www.ikea.com/ms/en_US/customer-service/about-our-products/planning-tools/index.html#>. Retrieved on Oct. 2, 2017, 3 pages.

Lee, "Ikea Place is an AR app that lets you put furniture on the street," The Verge [online]. Retrieved from the Internet: <https://www.theverge.com/2017/9/20/16339006/apple-ios-11-arkit-ikea-place-ar-app>, Sep. 20, 2017, 4 pages.

Modsy, "Try on Furniture in Your 3D Home," modsy.com [online]. Retrieved from the Internet: <https://www.modsy.com/>. Retrieved on Oct. 2, 2017, 8 pages.

U.S. Appl. No. 15/588,099, "Augmented or Virtual Reality to Scenario Plan Property Purchase or Renovation," filed May 5, 2017, 26 pages.

"Interior Design App Planner 5D Offers More Building Options than Minecraft and Integrates VR; Planner 5D, an interior design platform, uses gamification to make interior design fun and easy", NA. Normans Media Ltd. (Jul. 28, 2017) (Year: 2017).

Dinnocenzio, Anne, "Retailers eye adding robots, smart shelves: savvy shopper", South Florida Sun—Sentinel: A.12. Fort Lauderdale, Fla.: Tribune Publishing Company, LLC. (Jan. 17, 2017). (Year: 2017).

"Smart Living@Science Park features new theme; Io T Smart Home living ushers in the Big Data era aiding development of the Smart City", M2 Presswire: NA. Normans Media Ltd. (Apr. 7, 2016) (Year: 2016).

Hasan Selim, Determinants of house prices in Turkey: Hedonic regression versus artificial neural network, Expert Systems with Applications, vol. 36, Issue 2, Part 2, 2009, pp. 2843-2852, ISSN 0957-4174, https://doi.org/10.1016/j.eswa.2008.01.044 (Year: 2009).

\* cited by examiner

PROPERTY ENHANCEMENT ANALYSIS

CROSS-REFERENCE TO RELATED APPLICATIONS

This application is related to U.S. patent application Ser. No. 15/588,099, filed May 5, 2017, and entitled "Augmented or Virtual Reality to Scenario Plan Property Purchase or Renovation", the entirety of which is hereby incorporated by reference in its entirety for any and all purposes.

BACKGROUND

Property enhancement (e.g., home enhancement) exists at the intersection of aesthetic and financial considerations. It can be difficult for individuals to understand the interplay between these factors when considering the purchase of a new home or planning enhancements. Further, relevant financing information may not be readily available, let alone customized for relevant markets. Property owners may therefore have difficulty understanding relevant outcomes and improving decision making processes regarding property enhancement options.

SUMMARY

Embodiments of the disclosure are directed to methods and systems implemented, in part, with an augmented or virtual reality device to assist individuals in understanding the aesthetic and financial effect of property enhancements.

In an example, augmented or virtual reality is used to show a user what enhancements to their home would look like. Financial information and recommendations for preforming the enhancements can also be provided in real-time as the user changes the enhancements being rendered. In addition, an artificial intelligence framework and engine can be used to provide feedback to a user on possible value-affecting changes to a property.

The artificial intelligence framework and engine can review proposed renovations to the property and make suggestions on which to pursue and how such projects should be performed to optimize the increase in value of the property. For example, particular enhancements, enhancement timing (e.g., certain enhancements can be prioritized over others), and suggestions regarding enhancement options (e.g., materials and colors) to maximize the benefits to the property can be generated using the artificial intelligence.

The artificial intelligence can be trained using a variety of different information, including local and national information on building trends regarding property purchases and enhancements.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
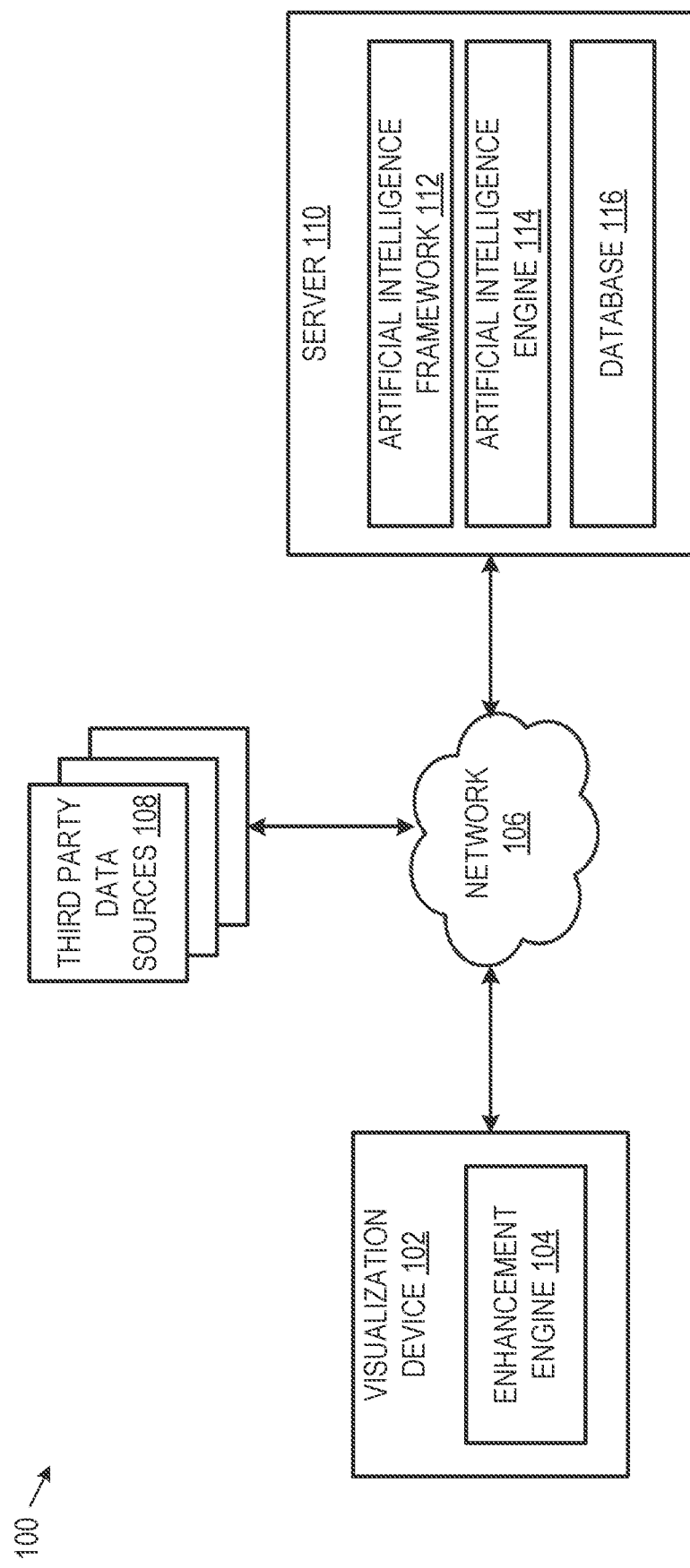
FIG. 1 illustrates an example system that can support the use of a visualization device in property enhancement planning.

The present disclosure is directed to technologies involving an artificial intelligence framework and a visualization device (e.g., an augmented reality device or virtual reality device) to provide improvements in assisting individuals in planning property enhancements or purchases while taking into account both aesthetic and financial factors. An enhancement to a property may include any change to a property, such as a renovation, a decoration, a replacement of an appliance, a reconfiguration, a remodeling, or a rearrangement. However, disclosed technologies may find wider applications.

Property enhancement involves aesthetic and financial considerations. It can be difficult for individuals to understand the interplay between these considerations. In an example, disclosed technologies can allow for improvement of a visualization device via an unconventional techniques, such as visualization of real-time financial analytics alongside an immersive visualization of the effects of an enhancement using a system including a augmented or virtual reality device connected to a server that provides relevantly-customized financial analysis.

Aspects of the disclosed technologies can be enhanced through the use of artificial intelligence to analyze data relating to the financial analytics. For example, the financial analytics can include customer accounts, savings availability, loan amounts, and potential returns on actions (e.g., remodeling actions), among other information. The artificial intelligence can optimize and predict the financial effects of property enhancements based on multiple factors. The artificial intelligence can be trained on a variety of factors and produce output relating to, among other things, suggestions of which enhancements to perform, suggestions of timing, and suggestions of materials or colors.

Aspects relating to the combination of artificial intelligence and visualization techniques can include the artificial intelligence proactively suggesting changes to a property to optimize value and visualize those changes using the visualization device. For instance, the artificial intelligence can continuously monitor local and national data to predict enhancement trends and suggest actions to take when a threshold is passed relating to a combination of enhancement trends, user finances, and user interest.

For example, trends may be predicted based on data obtained from retailers (e.g., describing the kinds of home improvement products that are selling well), social media (e.g., property enhancements that are trending on social media), and experts (e.g., property enhancements recommended by experts). Then, the visualization device (e.g., an augmented or virtual reality device) renders a scene used to show a user what upgrades and changes to a property would look like based on those trends and suggested actions. In addition to showing the changes in augmented reality and financial analysis, the system can provide information regarding how to proceed with the enhancement.

In an example, an enhancement engine may render an augmented or virtual view based on user-selected enhancement options as an overlay to an area that the user is viewing. The enhancement engine may render a total cost of the selected one or more enhancement options, as well as a cost breakdown corresponding to each individual enhancement option, a description of the enhancement option the store or manufacturer from which materials associated with the selected enhancement may be purchased, and the cost of labor to install the one or more selected enhancement options.

The enhancement engine may also obtain and render the financial effect of selected enhancement options to the user. The financial effect may be provided dynamically such that it changes automatically based on, for example, the enhancement options and the user's budget. The enhancement engine may also render credit opportunities that are available to the user. In some embodiments, the enhancement engine may only identify available credit for which the user is pre-approved, while in other embodiments, other credit options are provided. In some embodiments, the credit options are selectable and may open communication with the financial institution offering the credit so that the user may request such credit from the enhancement engine.

In an example use case, a prospective buyer of a house may use disclosed systems and methods to explore possibilities of what the house would look like when the prospective buyer puts their own touches on the property. For example, the prospective buyer may select enhancements and visualize the enhancements using a visualization device as the buyer tours the house to see what the property would look like with particular enhancements.

In some examples, the enhancements may be pre-selected by the prospective buyer, real estate agent, or seller. Where the enhancements are programmed by the prospective buyer, the person may be able to see what the house would look like with their own personal style applied. For instance, the prospective buyer may specify their particular style or what their current home looks like, and the enhancement engine 104 may use the provided information to automatically generate (e.g., using an artificial intelligence engine) enhancements for the house being toured so that the prospective buyer may see what the house would look like if renovated to the buyer's liking.

In addition, the prospective buyer may use the enhancement engine 104 to generate a summary of the enhancements along with the particular costs for the enhancements. In this manner, the prospective buyer may be able to take into account not just the cost of the property but also the cost of desired enhancements to the property when making a determination as to whether or not to purchase the home what kind of offer to make on it, and what kind of financing to pursue. For example, the prospective buyer may be touring multiple homes, each one with their own relative ability to be enhanced according to the prospective buyer's tastes. The prospective buyer may use disclosed technologies to make the process easier.

The enhancement engine may leverage an artificial intelligence framework to help the prospective buyer make such determinations. For instance, the artificial intelligence framework may take into account types of materials, cost of materials, and cost of labor in the area, as well as particular information about the property (e.g., structural characteristics of a building, aesthetic characteristics of a building, and lot characteristics, such as whether the lot can accommodate a third garage stall).

The artificial intelligence engine can obtain data from third party data sources (e.g., an assessor's office) and use the data to assess the cost of such an enhancement. For example, where the enhancement involves moving a wall, the artificial intelligence engine may estimate relevant costs for the wall by obtaining data relevant to the enhancement, such as square footage, wall type (e.g., 2×4, 2×6, 2×8), wall thickness, insulation type, ceiling type, type of roof, roof pitch, and so on. As part of the process, the enhancement engine and artificial intelligence engine may obtain data from multiple different data sources (e.g., an insurance company, assessor's office, home improvement retailer, etc.) to generate a composite of the property and generate an average cost of square footage. The cost of enhancements may depend on a local market (e.g., the real estate, material, and labor market that effects the cost of enhancements for the particular property). A localized comparable standard for a cost may be generated and used.

In another scenario, the system may be used by a person planning on selling a home in a particular timeframe. The person can use the system to enhance the property in preparation for selling it. For instance, the person can run a cost-benefit analysis to determine how to increase the value of the home. The system may take into account the diminishing returns of changes. For example, expanding a kitchen may increase the value of a property, but there can be a point of diminishing returns, so the system can determine an optimal enhancement to the kitchen.

The system may also allow the comparison of changes against potential gain in an area. For example, enhancements to a particular home may be bounded by what enhancements are available in homes in the area. For instance, a particular kind of countertop may be popular in an area and so in order for the home to be comparable to others in the area (and thus attractive to buyers), the home should be enhanced with that particular kind of countertop as well. In the alternative, such information can be used to determine unique features that may enhance the property and make it stand out among competition in the area. For example, if many of the homes selling in the area lack a deck, then the system may recommend adding a deck to stand out from the competition. As another example, the recommended enhancements may improve searchability for prospective buyers of the property, such as a fence or accessibility features (e.g., a ramp).

With particular enhancements visualized, the system may connect the user with the necessary resources (e.g., materials, contractors, permits, loans, etc.) to carry out the visualized enhancements.

FIG. 1 illustrates an example system 100 that can support the use of artificial intelligence and a visualization device in property enhancement actions. The example system 100 includes a visualization device 102 connected over a communication network 106 to one or more third party data sources 108 and a server 110. The device 102 may include an enhancement engine 104, among other components. The server 110 may include an artificial intelligence framework 112, an artificial intelligence engine 114, and a database 116, among other components. The visualization device 102 may obtain or receive information from the server 110 based on the artificial intelligence framework 112, artificial intelligence engine 114, and database 116.

In some embodiments, the device 102 is an electronic computing device with visualization capabilities. For example, the computing device can be a smartphone with a display and an application running on the smartphone to allow the visualization of information or the user via a display. In another example, the device 102 may be able to provide Augmented Reality (AR) or Virtual Reality (VR) functionality via a headset or other device that can be worn or carried by a user.

An example of a VR device that may provide functionality via a headset may include a computing device connected to a VR headset, such as a VIVE headset by HTC CORPORATION of New Taipei City, Taiwan and VALVE CORP. of Bellevue, Washington. Another example device is a smartphone used in conjunction with a headset, such as a GEAR VR by SAMSUNG ELECTRONICS CO., LTD. of Suwon, South Korea and OCULUS VR, LLC of Menlo Park, California. An example of an AR device that the user may use to visualize enhancements is an AR headset.

An example AR device that may be used is a smartphone or tablet computer that includes AR components such as a processor, display, camera, and an AR software application The display can render virtual images and permit the user to see through the display (either directly, such as when the display is semi-translucent, or through an augmented feed from the camera). In such an embodiment, the smart phone or tablet computer may render a virtual image on a display screen of the smart phone or tablet computer. An example of the device 102 may include a computing device connected to an AR headset such as a HOLOLENS by MICROSOFT CORPORATION of Redmond, Washington. Another example of the device can include a smartphone having augmented reality functionality, such as an IPHONE by APPLE INC. of Cupertino, California or a device running GOOGLE LENS by GOOGLE INC. of Mountain View, California. In some examples, the device may have LEDs (Light Emitting Diodes) or other components for projection or display of information (e.g., images or data) on glass (e.g., embedded LEDs on glass). An example device includes GOOGLE GLASS (also by GOOGLE INC.), which has a head-mounted display that may be used for augmented reality applications.

In an example, the device 102 includes a processor and a display. The device 102 can also include one or more components usable for determining the location of the device (e.g., a GPS antenna, a WI-FI antenna, a cell signal antenna, etc.). The device 102 may further include wireless telecommunication capability to permit a wireless communication to other components of the system 100. The device 102 can also include voice-recognition capability to allow the user to direct the device 102 via voice commands. Alternatively or additionally, the device 102 may accept touches (e.g., taps or swipes), hand gestures, eye gestures, head gestures, or any combination thereof as commands to direct the device 102.

The device 102 may include a camera module. The camera module can be used to capture visual data to allow a user to capture and share images. In addition, output of the camera can be used to provide data for use by an augmented or virtual reality engine, a room mapping engine, or an artificial intelligence, among other components. The camera module can include one or more sensors for capturing image data, such as a standard visual spectrum camera sensor, an infrared sensor, and a depth sensor, among others. The camera module can also include supplemental modules, such as a flash module and an infra-red projector, among other modules.

As described in further detail herein, the enhancement engine 104 is an application that can provide some or all of the enhancement and financial analysis visualizations for the device 102, among other capabilities. The enhancement engine 104 is an application that can be wholly or partially installed on the device 102. Alternatively or additionally, some or all of the enhancement engine 104 can be installed remotely and executed by or interacted with using the device 102. In some embodiments, the enhancement engine 104 can render one or more property enhancement options and corresponding financial analysis on a display of the device 102.

In some embodiments, the enhancement engine 104 may generate enhancement options for the user so that the user may visualize and plan the enhancement using the visualization device 102. For example, the enhancement engine 104 may provide a user interface such that the user may visualize a property enhancement option, as well as financial aspects relating to the enhancement. For example, the enhancement engine 104 may provide the user with options based on a particular room in which the user is standing. For example, using output from the camera module, the enhancement engine 104 can identify that the user is standing in a kitchen (e.g., using a computer vision algorithm and an object recognition algorithm).

The enhancement engine 104 can then use artificial intelligence to determine kitchen enhancement trends and generate a financial analysis on the effects of those enhancements based on the particular kitchen in which the user is standing (e.g., a cost of a particular enhancement trend based on the cost per square foot of a particular enhancement and the square footage of the kitchen). The enhancement engine may then provide options for cabinets, countertops, sinks, fixtures, flooring, backsplashes, and other aspects for the given kitchen based on financial information associated with the enhancement (e.g., an actual or perceived budget). These options can then be visualized for the user using the visualization device 102. In another example, if a bedroom is selected, the enhancement engine 104 may provide similar functionality for flooring, paint, wallpaper, curtains, and other bedroom fixtures.

In some embodiments, the enhancement engine 104 may generate the financial analysis based on the one or more enhancement options selected by the user and the associated financial information. Generation of financial analysis will be described in further detail herein. In other embodiments, the enhancement engine 104 obtains and renders the financial analysis on the display of the device 102. Accordingly, the enhancement engine 104 may render enhancement options on the device 102 alongside the corresponding financial analysis of the particular enhancement option so that the user may visualize the enhancement and the financial effect of the enhancement.

In some embodiments, the user may select a particular enhancement option through the visualization device 102. In some embodiments, the enhancement engine 104 may facilitate the using taking action beyond visualizing an enhancement and associated financial analysis. In some examples, the enhancement engine may facilitate the user taking action to carry out the enhancements, such as ordering materials, contacting a contractor, obtaining permits, obtaining a loan, and refinancing the property, among other actions.

Although in example embodiments, the enhancement engine 104 is described as providing certain functionality, it is understood that the disclosure is not intended to be limited to a particular configuration. Another server or server 106 may execute such functionality described above. In such an embodiment, the device 102 may show the images generated by such other device.

In some aspects, network 106 is a computer network such as an enterprise intranet and/or the Internet. The example network 106 may include a Local Area Network (LAN), a Wide Area Network (WAN), the Internet, wireless and wired transmission mediums. In further aspects, server computing devices as described herein may communicate with some components of the system 100 via a local network (e.g., an enterprise intranet), whereas such server computing devices may communicate with other components of the system 100 via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

The third party data sources 108 may provide data to facilitate functionality of the enhancement engine 104 and artificial intelligence engine 114. For example, the enhancement engine 104 may obtain data from the third party data sources 108 and base a visualization at least in part on the data from the third party data sources 108. As another example, the artificial intelligence engine 114 may train the artificial intelligence framework 112 based on data obtained from the third party data sources 108. The third party data sources 108 may include servers that host data for appliance stores, appliance manufacturers, contractors, home improvement stores, municipalities, real estate listing services, insurance companies, financial institutions, assessor's office, design institutions, property enhancement publications, and social media platforms, design consultants, and virtual asset providers (e.g., providers of 3D models), among others.

The third party data sources 108 may provide the device 102 with one or more images that show how the selected enhancements will look. In another example, the third party data sources 108 can provide pricing information corresponding to one or more enhancements being visualized by the visualization device 102. The pricing information may include, for example, the material and labor costs for a particular enhancement. The enhancement engine 104 may display the one or more images of the enhancements as an overlay to the room the user is viewing through the device 102 along with the cost of such enhancements.

The information may also be used to train the artificial intelligence framework 112 and allow for determinations based on local real estate market data (e.g., data sufficiently local to affect the price of the property), maintenance data (e.g., as may be used to determine the lifespan or long-term maintenance cost of an enhancement or current property aspect, such as appliances that may be replaced or fixed as part of an enhancement), baseline property data (e.g., zoning and local incentive data, such as data that may be used to determine whether a property's lot can accommodate third stall or whether a user can receive a tax credit or energy discount for a certain enhancement), and preferences of a property owner (e.g., based on designs or homes "liked" on social media platforms), among other data. Such information can be used by the artificial intelligence framework 112 or the enhancement engine 104 to make various determinations, including: whether a property owner or user would like a particular enhancement, what enhancements for property are recommended based on current or predicted future trends, whether potential property buyers would like a particular enhancement, whether particular unique factors for a property are likely to increase or decrease the value of the property, happiness factors for a particular enhancement, projected lifespans for current property features or enhancements, projected value over time for particular enhancements, how particular enhancements factor into other properties in the area, whether particular enhancements fit a user's preferences, and whether it is timely for a particular enhancement to be taken (e.g., as may be based on user finances, governmental incentives, retailer incentives, market optimization, and a happiness index), among other determinations.

The example server 110 may be one or more servers of a financial institution such as a bank. The server can include an artificial intelligence framework 112 and an artificial intelligence engine 114. In some embodiments, the user has one or more financial accounts at the financial institution. The server 110 can store financial records for the user or property owner or at another server computer or database accessible from server 110 such as, for example, the database 116. In some embodiments, the user may provide authentication information via the enhancement engine 104, which may be used to access the financial information.

The artificial intelligence framework 112 may be of a variety different kinds of artificial intelligence or machine learning frameworks that provide useful output based on an input. For instance, the artificial intelligence framework 112 can include one or more of: a neural network, a deep learning, or a regression framework. One or more aspects of the machine learning techniques used herein may be implemented using machine learning software, including but not limited to: TENSORFLOW by GOOGLE INC. of Mountain View, California; OPENAI GYM by OPENAI of San Francisco, California; or MICROSOFT AZURE MACHINE LEARNING by MICROSOFT CORP. of Redmond, Washington. In some examples, the artificial intelligence framework 112 can include a plurality of different artificial intelligence frameworks. Each of the different artificial intelligence frameworks may be customized for a particular purpose. For instance, there may be a framework customized to each individual user or customized to a particular area (e.g., neighborhood, municipality, county, state, country, etc.). The artificial intelligence engine 114 may use the plurality of different frameworks to produce an output customized to a particular purpose.

The artificial intelligence engine 114 may be an application configured to provide artificial intelligence services, such as providing output responsive to an input and based on the artificial intelligence framework 112.

The database 116 can store user or property owner information such as, for example account information and financial information (e.g., enhancement budget information, credit card information, savings account information, checking account information, credit score, etc.). In other embodiments, the database 116 stores additional customer information such as, for example, the customer's social media account information. As will be described herein, the enhancement engine 104 may retrieve financial information from the database 116 to generate a financial analysis of enhancements selected by the user.

The database 116 may also store preferences (e.g., user style preferences, preferred third party providers of enhancement materials or services, etc.). The database 116 may also store information regarding the user's budget or approved line of credit or loan value to determine enhancement options the user or property owner can afford. Accordingly, the database 116 may store financial and other personal information.

Figure 2:
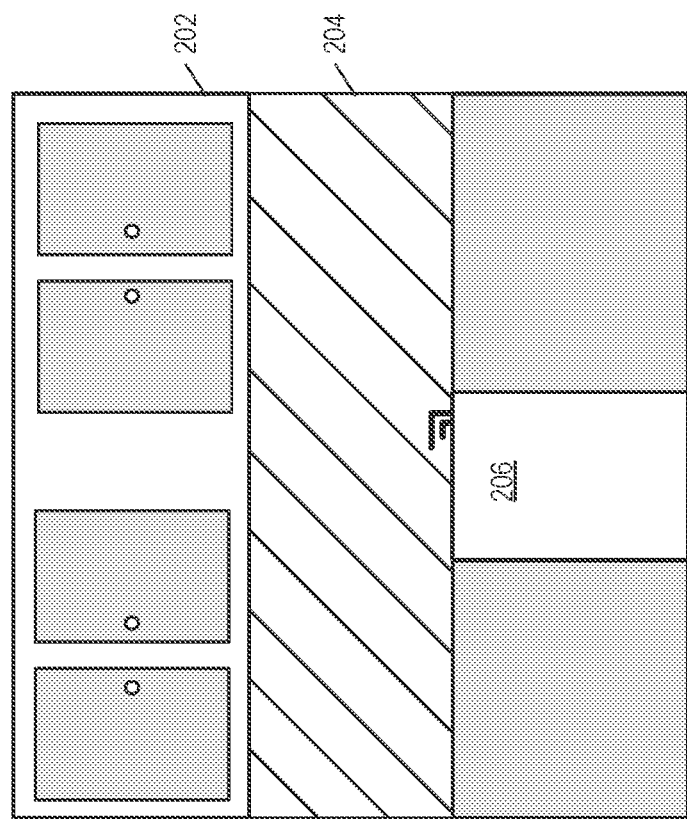
FIG. 2 illustrates an example scene of a kitchen.

FIG. 2 illustrates an example scene 200 of a kitchen to which disclosed embodiments may be applied. In this example, the illustrated scene 200 shows a view of a kitchen as it currently exists. The kitchen has original cabinets 202, an original backsplash 204, and an original sink 206. In some examples, the scene 200 is the actual user's or property owner's kitchen as visualized through the device 102 as the user or property owner stands in his/her kitchen. In other examples, the scene 200 is a pre-recorded view of the kitchen (e.g., captured using a smartphone camera, a 360-degree camera, a VR-capable camera, etc.).

As will be described in further detail herein, the user may seamlessly walk through the home and visually see the enhancement options to each room, the cost of each option (including a breakdown of costs for each individual option), and/or the corresponding financial analysis. As will also be described in further detail, financial analysis may describe the budget or required credit for the selected one or more enhancement options, and credit options. In other embodiments, financial analysis describes different financial information.

Figure 3:
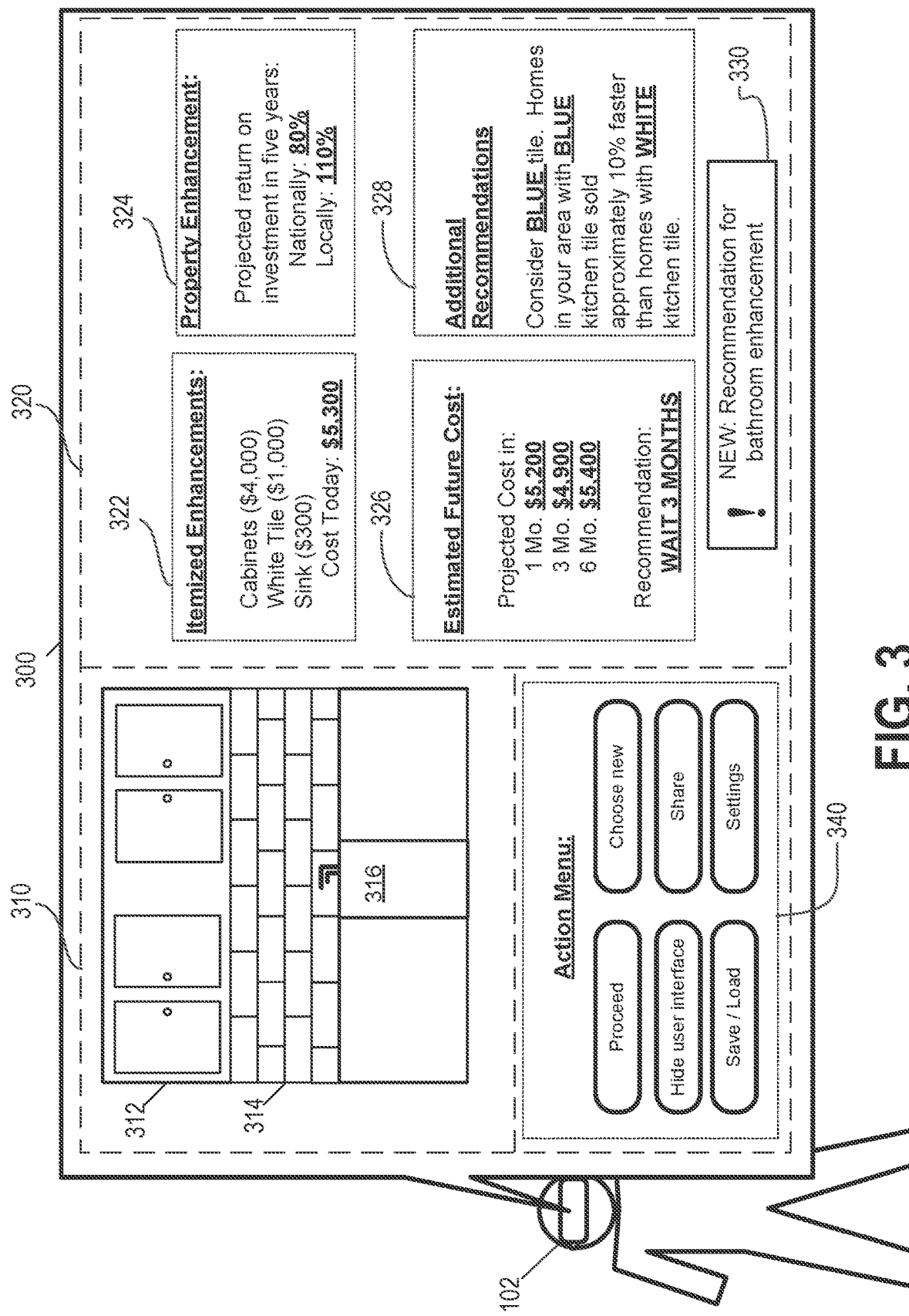
FIG. 3 illustrates an example scene as viewed from the device of the system illustrated in FIG. 1.

FIG. 3 illustrates an example visualization scene 300 of the kitchen of FIG. 2 as viewed using device 102 of the system illustrated in FIG. 1.

In this example, the illustrated scene 300 is viewed from the user's perspective through the device 102. The example scene 300 includes an enhancement view 310 of the kitchen, an enhancement view 310 of the selected enhancement options, and an analysis view 320 of the selected enhancement options, including recommendations.

In the illustrated example, the scene 300 is shows an enhancement view 310 of the kitchen. Although the kitchen is shown in this enhancement view 310, it is understood that the current disclosure is not intended to be limited to only the kitchen. The enhancement view 310 can show any type of property enhancement and need not be limited to a room inside a home.

In this example embodiment, the enhancement engine 104 causes the device 102 to display one or more images relating to enhancement options selected by or presented for the user. The device can display the images and other information as an overlay to the room the user is viewing through the device 102, thereby augmenting the view to allow the user to visualize potential enhancements to the kitchen.

In the illustrated example, the example enhancement view 310 displays the kitchen augmented with enhancement options for the cabinets 312, the backsplash 314, and the kitchen sink 316. In one embodiment, the user may swipe through various options and in another embodiment, the user may select a type associated with the enhancement option that would thereafter be displayed in the enhancement view (e.g., the user may select the type "white wood cabinets"). In some embodiments, the user may use hand gestures, voice, brain activities, or eye movement to control the device 102 to display various enhancement options. The enhancement view 310 therefore displays the renovated view of the kitchen so that the user may visually see how the room would look with the selected enhancement options.

The options available for selection by the user may be curated by the enhancement engine 104 or the artificial intelligence engine 114. For instance, the enhancements may be filtered to fit a user's preferences (e.g., the user can specify preferred color schemes, materials, styles, and the like, and the enhancements may be curated to allow the user to choose from among enhancements matching the user's preferences), to fit a user's budget, to fit current trends, and to have a particular return on investment, among others.

The analysis view 320 provides the results of an analysis (e.g., conducted by one or both of the enhancement engine 104 or the artificial intelligence engine 114). The analysis view 320 is a dynamic view that changes based on the one or more enhancements being visualized. As described herein, the third party data sources 108 and the server 110 may provide information that forms the basis of the information displayed in the analysis view 320.

In the illustrated example, the analysis view 320 provides an itemized description 322 that shows a list describing the enhancements being visualized and their costs. The itemized description 322 may include more, fewer, or different options, depending on the one or more enhancements being visualized. For instance, the itemized description 322 may also show the name of the store, shop, manufacturer, fabricator, or source from which the materials and labor originate. The user may also have the option to select enhancement options from a particular store, shop, or source. The itemized information can be based on responses to queries sent from the enhancement engine 104 to the third party data sources 108. For example, the queries may be made to home improvement stores and contractors (e.g., made over an application programming interface of the data source) and the responses may include the costs for materials and labor near the user's location (e.g., near enough that it is reasonable for the user to obtain the goods and services from a provider associated with the data source). For example, the cost for cabinets can be an average cost for cabinets in the user's city. Alternatively or additionally, the itemized description 322 may separate out the labor cost install the visualized enhancement, as well as fees associated with taxes, permitting, disposal, and other potential cost sources. In some embodiments, the itemized description 322 may flag enhancement options that are outside the user's budget. In such instances, the device may provide alternate enhancement options within the user's budget.

The illustrated example further includes a property enhancement description 324. This description can analyze a potential effect of the enhancement on the property itself. As illustrated, this includes a display of an analysis regarding the projected return on investment for the enhancement in a particular period of time. This includes an analysis of both the national and local views. For example, a particular enhancement to property may have a higher or lower return on investment depending on where the user is located. This can be based on a variety of factors, such as local weather and a local housing market. Other information relating to a financial analysis of the effect of the enhancement can be provided. For example this can include a determination of whether the enhancement has a substantial increase in value of the property, whether that change affects the long-term value analysis for the property, whether the change would eliminate a private mortgage insurance, or have another kind of financial effect for the user or property owner.

The illustrated example further includes an estimated future cost description 326. The estimated future cost description 326 can include information regarding an estimated cost to perform the enhancement. The pricing of various property enhancements can vary depending on the time of year as well as local supply factors, among others. As illustrated, the estimated future cost to perform the visualized enhancements is estimated to be lower in three months than it is currently. So the enhancement engine 104 provides a recommendation to wait three months.

The illustrated example also illustrates an additional recommendations view 328. This can be a region that displays recommendations based on the current enhancements. In this particular instance, the additional recommendation is made to consider blue tile as opposed to the currently-selected white tile. And the recommendation provides the rationale that the use of blue tile may have a positive effect when attempting to sell the property. In another example, the recommendation may be to use a different kind of material. For instance, it may be determined that the user is exploring (e.g., visualizing) laminate countertops but that another kind of material (e.g., quartz or granite) would have a larger benefit (e.g., higher return on investment), so the system recommends those other materials.

The analysis view 320 also includes a notification 330. The analysis view 320 can use notifications 330 to alert users to changes in information. For example, if a user had previously visualized information regarding a kitchen remodeling enhancement and there had been a substantial change in one or more estimates since that enhancement was last visualized, the analysis view 320 can display notification 330 informing the user of this change. In the illustrated example, the notification 330 indicates that there is a new recommendation for a bathroom enhancement. For instance, the enhancement engine 104 can automatically and continuously analyze a variety of factors that go into enhancements (e.g., cost, current trends, budget, etc.) and recommend enhancements to the user based on the analysis.

The analysis view 320 illustrated in FIG. 3 is an example. The analysis view 320 in other examples can have the same or different features. For instance, a user that is interested in selling his or her home in three years, can provide this information to the enhancement engine 104, which can then use information to adjust the information displayed using the visualization device 102. For example the property enhancement description 324 can be modified to display a projected return on investment in three years rather than a default number of years (e.g., five years). In another example, a user may indicate that he or she is not interested in selling the property anytime soon and so the enhancements may be selected based more on a user's preferences, rather than current popular trends or changes that will have a particularly large return on investment in a certain number of years.

The analysis view 320 can further display the financial effect of the selected enhancement options to the user. For example, the enhancement engine 104 can retrieve the user's financial information from a financial database (e.g., database 116) associated with a server (e.g., server 110) of the user's financial institution. The financial information can used to generate a financial analysis of enhancement options selected by the user. In some embodiments, the financial information may be the user's enhancement budget, which may be obtained from the various financial accounts of the user.

Alternatively or additionally, financial analysis may display financial information such as down payment information, monthly payment options (taking into consideration the user's budget). Furthermore, financial information may further indicate the user's credit rating and available credit from the financial institution. The financial information can also be used to recommend to enhancement options. For example, an enhancement timetable can be generated based on the user's finances, savings plans, loan availability, and so on. The information can further be based on a user's mortgage for the property for which enhancements are being visualized.

The scene 300 can further include an action menu 340 with user interface elements (e.g., buttons) selectable by the user to take an action with regard to the current scene 300. For example the action menu 340 can include a user interface element that allows the user to proceed with currently-visualized enhancements. In response to the selection of this element by the user, the enhancement engine 104 can take a variety of actions. For example, the enhancement engine can provide to the user recommendations (e.g., contact information) for vendors or contractors to help the user make the enhancements.

For example, a provider of the enhancement engine 104 can have a relationship with various vendors (e.g., negotiated the group discounts for users of the system 100 or have sponsors for the system) and the recommendations can be based on these relationships. As another example, a particular vendor may have coupons or other incentives (e.g., financing, utility company rebates, etc.). The enhancement engine 104 may also facilitate the generation of contracts, the acquisition of permits, the generation of loan requests, the generation of home refinancing scenarios, among other activities relevant to the selected actions. For example, where the enhancement involves adding an addition to a home, the enhancement engine 104 can provide the user with a link to contracts, loan documents, necessary permits and other documents. Such information can be obtained from a variety of sources including but not limited to local municipal data sources.

The action menu 340 can include a user interface element that allows the user to choose new enhancements. In response to the selection of this element by the user, the enhancement engine 104 can take a variety of actions. For example, the enhancement engine 104 may allow the user to modify currently-visualized enhancements (e.g., change the color of the currently displayed tile) or select new enhancements (e.g., adding an island to the kitchen, adding a window, etc.). In some examples, the enhancement engine 104 can help guide the user to particular enhancements, such as by recommending or showing trending enhancements. In some examples, rather than specifying a particular enhancement, the user can select a level of change to visualize. For instance, the enhancement engine can allow the user to select between low, medium, and high level enhancements which can correspond to low, medium, and high levels of effort or cost to perform enhancements. A low-level enhancement could correspond to simply a new coat of paint, while a high level enhancement could involve moving a wall or other major work.

The action menu 340 can include a user interface element that allows the user to hide the user interface. In response a selection of settlement, for example, the user interface elements can disappear from view, thereby giving the user a fuller view of the enhancements. This can be helpful for allowing the user to more realistically visualize what the enhancements would look like if undertaken.

The action menu 340 can also include a user interface element that allows the user to share the visualization. In response to the selection of such interface elements, the enhancement engine 104 can take a variety of actions. For instance, the enhancement engine 104 can generate a summary view of the visualization. The summary view can include some or all information shown in the scene 300. In some examples, the user can select a particular kind of summary to be shared. For example, there may be an option to share a simple summary for sharing on social media, while there may be a more substantial summary that can outline particular materials, contractors, permits, contracts, financial information, timetable, and other substantive information useful for carrying out the enhancement. In some examples, the summary may include a maintenance schedule for the enhancements. For instance, the maintenance schedule may be a schedule for appliances, lawn care, sealing countertops, and other maintenance tasks that may be needed for the selected enhancement.

In yet another example, the sharing action can allow the user to share the visualization with another user who is also using a visualization device. This kind of sharing can be particularly useful for allowing multiple people to experience the visualization. For example, multiple members of the same family may want to see the same visualization to better understand potential changes to their home. In another example, designers, decorators, and contractors may want to share visualizations of potential upgrades with their clients. In still a further example, a seller of a home may want to show potential purchasers of a home various options for how they can customize the home to their liking if they purchased it.

The action menu 340 can also include a user interface element that allows the user to save or load the visualizations. In response to selection of this user interface element, the enhancement engine 104 can take a variety of actions. For instance, enhancement engine 104 can provide a dialog box or other user interface prompt to allow the user to select a particular enhancement to save or load. This can provide a variety of different useful features to the user including but not limited to the ability to save multiple different options and revisit them later. It can also allow the user to save a particular set of enhancements (e.g., a particular color and material combination) and then load that particular set of enhancements for application elsewhere.

As particular example, a person looking to purchase a home may have a particular set of enhancements in mind for their kitchen. The user could save them and when visiting homes for sale, the person could load those save enhancements and view the kitchen of the home as though it would look with those particular enhancement. Such a configuration can allow for ease of use for the user and more flexibility with the enhancement. In another example, the user may capture an image of the currently-visualized property in a format that can be viewed and visualized later without needing for the user to be present at the property.

The action menu 340 can also include a user interface element that allows the user to modify one or more settings. For instance in response a selection of this user interface element, the enhancement engine 104 can provide a settings menu that allows the user to change one or more options regarding the enhancement engine 104 or the scene 300 being displayed.

The sharing of the visualization of the enhancement among multiple visualization device users can involve pairing multiple different visualization devices together. This can allow changes in one visualization device to be shared with other paired visualization devices. This can involve sharing a session identifier among multiple different visualization devices. The visualization devices can then connect to the server 110 and, using the session identifier, use the server 110 to synchronize some or all of the scene 300 among the multiple devices. In another example, the multiple devices may communicate over a local area network (e.g., over WI-FI) or over a wide area network (e.g., over the Internet) to synchronize rendering.

As also described herein, the financial information retrieved from the database 116 may also store the user's enhancement preferences such as, for example, the customer's style preferences, preferred third party providers, etc. The database 116 may also store information regarding the customer's budget to determine enhancement options the user can afford. Accordingly, the database 116 may store financial and other personal information of the user.

In some embodiments, the analysis view 320 displays the user's budget and required credit. In this example, the required credit is a dynamic value that changes based on the enhancement options and the user's budget. In some embodiments, the enhancement engine 104 identifies one or more credit options available to the user, as offered by a financial institution from which the user may be a member. Accordingly, the analysis view 320 may further display such credit options available to the user. In some embodiments, the enhancement engine 104 may only identify available credit for which the user is pre-approved. In such an example, the user may seamlessly request such available credit using the device 102.

In yet other alternatives or additions, the financial analysis view 320 can also provide a custom analysis of the user's finances and suggest options including a staged approach or a delayed approach for the enhancements. For example, if the total enhancement costs significantly exceed the budget, the system can suggest some enhancement options that can be performed now and other enhancement options that can be performed in the future when additional money becomes available. Such a configuration can take into account the user's current and potential future finances, such as by analyzing the user's typical cash flow. Further or alternatively, the system can suggest a complete delay of the enhancements until a later date. In such a scenario, the system can again take into account the user's financial position. The system can, for example, suggest delaying the enhancement for a period of time (e.g., six months, one year, etc., when the user has saved additional monies) or until a specific date (e.g., late December when a bonus is typically received). Other configurations are possible.

In some examples, the financial analysis view 320 can optionally show insurance implications for the enhancement as well. In such an example, the user can select the "insurance options" item to receive information on how an enhancement may affect insurance options for the enhancement and/or structure. For example, if expensive appliances or other items are being added to the property, the system may provide insurance options for those items. Similarly, if the property value is increased based upon the enhancements, the system can do an analysis and indicate if the increased value might warrant an increase in property insurance. Accordingly, embodiments of the present disclosure enable the user to visualize enhancement options, the total cost associated with various options, and the financial effect of each option. Furthermore, embodiments easily provide the user with ways in which to obtain credit, if necessary.

Although the figure illustrates that the enhancement view 310 and the analysis view 320 as separate, they need not be. For example, one or more aspects of the analysis view 320 may be overlaid on top of the enhancement view 310. In another example, some or all of the information contained in the analysis view 320 need not be displayed separately at all. For instance, to improve the user's comprehension and understanding and ease-of-use of understanding complex financial information alongside complex enhancement information, the analysis information can be incorporated into the augmenting of the reality shown in the enhancement view 310. This can provide substantial improvements to the user's experience.

As a specific example, the cost of the enhancements that may be displayed in the itemized description 322 may instead directly modify what is shown the enhancement view 310. For instance, more expensive enhancements may glow a particular color (e.g., red), while less expensive enhancements may glow a different color (e.g., green). Similarly, information regarding a potential return on investment for the property may be used to modify what is shown in the enhancement view 310. For instance, enhancements that have a high return on investment may glow brighter than enhancements that have a lower return on investment. In yet another example, recommendations that the enhancement engine 104 has for the user need not just be displayed as a pop-up box. Instead, they may be shown in the enhancement view 310 in a modified manner. For instance, they may be grayed out, have a relatively lower opacity, or otherwise be indicated as a suggestion option is not currently being displayed.

In this manner, the combination of financial and enhancement information provides unique improvements to the user experience and allows users a better opportunity to understand the direct financial locations of enhancements on their home in addition to understanding what those enhancements would look like. This combination of enhancements improves the functioning of the visualization device 102 in its ability to display information to the user in a much more understandable manner.

In a further example, such modifications of what is shown in the enhancement view 310 based on the analysis information can occur in real time. For example, as the user modifies the room, the enhancement engine 104 modifies the display of the financial information associated with the change. For instance, as the user changes tile in a kitchen backsplash, the enhancement engine 104 can directly show the user not just what that tile looks like, but the direct financial effect that the change will have on the home in real time giving the user fast feedback. In addition, the visualization of information can allow the user to understand the changes in an easier manner. Just as the visualization of the enhancement allows users to understand the visual effect of the enhancements, the ability to have the enhancement view 310 be modified according to the financial analysis can allow the user to visualize the enhancements in an improved manner.

Figure 4:
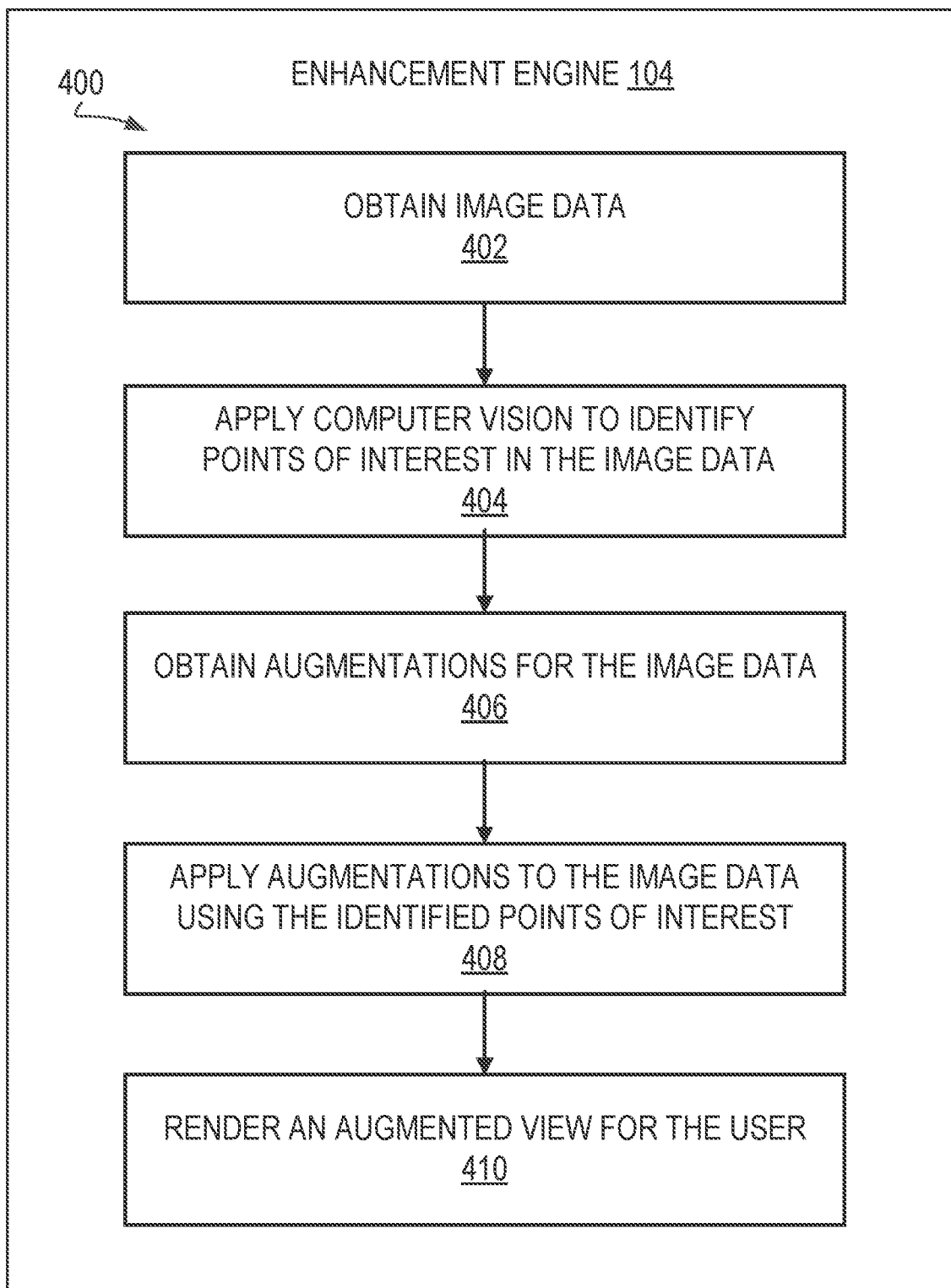
FIG. 4 illustrates an example process used by the enhancement engine to provide an augmented view to the user via the visualization device.

FIG. 4 illustrates an example process 400 used by the enhancement engine 104 to provide an augmented view to the user via the visualization device 102. The process 400 can begin with operation 402, which involves obtaining image data to be augmented. This can involve obtaining image data from, for example, a camera of the visualization device 102. The image data can be a live image data (e.g., from a live image data feed from the visualization device 102) or static image data previously recorded. The processes shown and described in relation to FIG. 4 and elsewhere may be implemented using a framework, such as ARKIT by APPLE INC. of Cupertino, California or UNITY by UNITY TECHNOLOGIES SF of San Francisco, California.

Next, in operation 404, computer vision techniques are applied to identify points of interest within the image data acquired in operation 402. This process can involve identifying objects within the image data (e.g., walls, floor, markers, etc.), as well as identifying relevant information within the image data needed to provide the visualization to the user. For instance, where the visualization device 102 is an augmented reality device, this step can involve identifying relevant points to anchor modifications or setting overlay.

Next, in operation 406, augmentations of image data are obtained. The augmentations can be, for example enhances that the user would like to visualize using the visualization device on the image data. For example, continuing the kitchen example from FIGS. 2 and 3, this step can involve enhancements that the user would like to make to the kitchen. For example, the user may want to visualize what a kitchen backsplash would look like if it were made of white tile. The enhancement engine can, based on the request enhancement, obtain (e.g., from a third party data source 106) information regarding what that enhancement would look like in general, such as what white tiles look like. In some examples, the server 110 may maintain a library of enhancements pre-configured and already designed to be suitable for visualization using the visualization device and the enhancement engine 104.

Next, at operation 480 the obtained augmentations are applied to the image data using the identified points of interest from operation 404. This can involve, for example, using points of interest in the image data that indicate the location of a backsplash and then augmenting the image data based on those identifiable points of interest to replace the original backsplash in the image data with the augmentation information regarding the requested tile configuration in operation 406. With the augmentations applied the image data, the augmented view can be rendered and provided to the user 410. In examples where the image data is static image data, the augmented image data can be displayed to the user. In other examples, such as where the image data is a live image data feed and the visualization device 102 is an augmented reality device, the augmentations can be overlaid or otherwise composited in the user's view using the visualization device 102 so as to render the scene 300. Similar approaches may be used to generate and render the analysis view 320. For example, the augmentations image data may be user interface elements that are representative of analysis information to be displayed to the user. For example, the augmentation may be a text box containing text generated based in a financial analysis of the selected enhancements.

Figure 5:
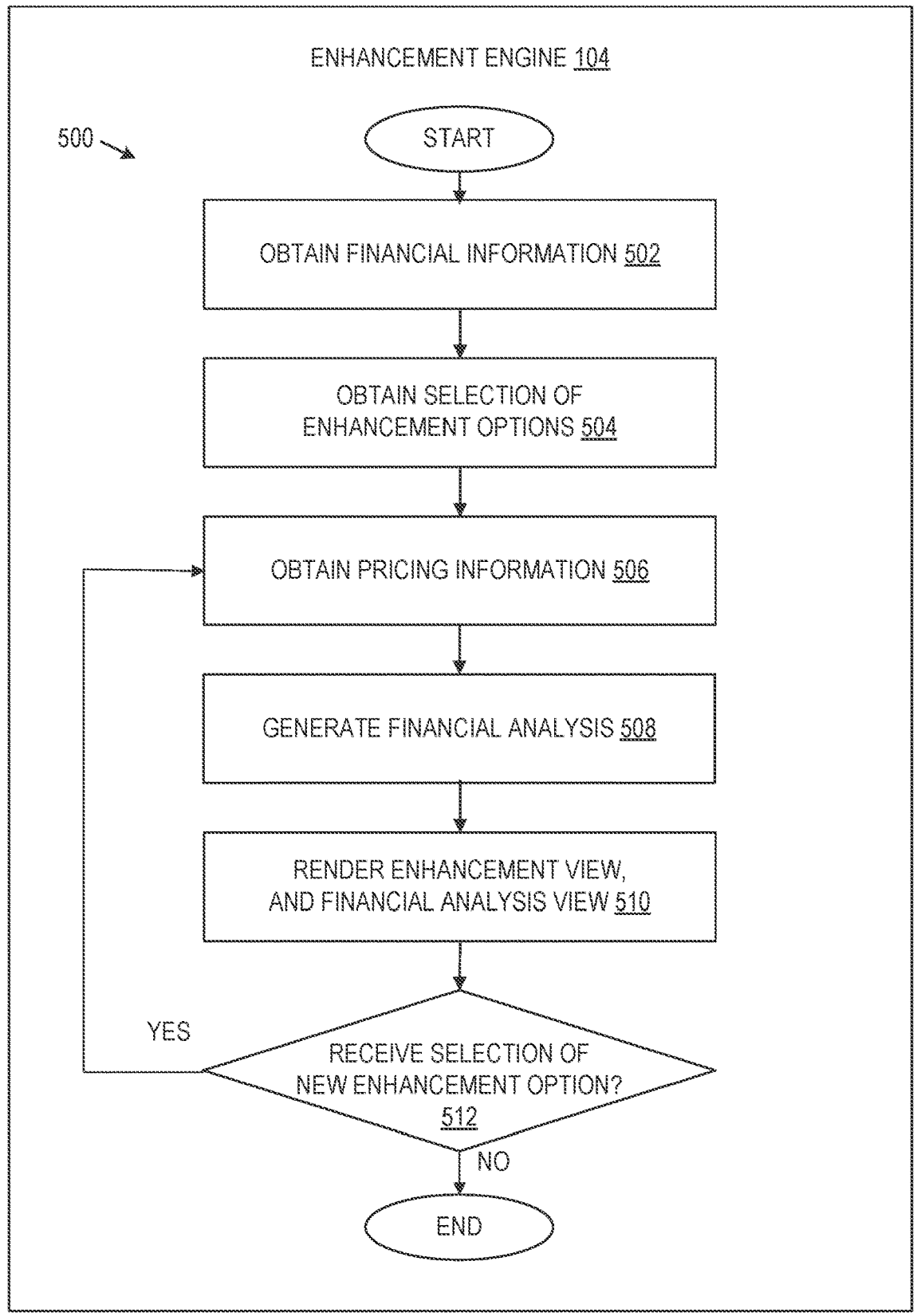
FIG. 5 illustrates an example method that may be carried out by the enhancement engine for rendering enhancement options and an associated financial analysis.

FIG. 5 illustrates an example method 500 that may be carried out by the enhancement engine 104 for displaying enhancement options, associated cost, and financial analysis (e.g. as may be displayed as part of the scene 300). In some examples, one or more aspects of the method 500 may be carried out by other components of the system 100, such as the server 110.

Method 500 begins at operation 502 in which the enhancement engine 104 receives the financial information, such as the financial information of the user or the owner of the property. As described herein, the enhancement engine 104 may communicate with a server (e.g., server 110, which may be owned by a financial institution) to obtain the financial information. The obtained financial information may be, for example, information about an enhancement budget, savings account, checking account, and credit score. Other financial information may also be obtained. In some examples, the financial information may be obtained directly by the visualization device 102, such as by prompting the user to provide the information.

In operation 504, the enhancement engine 104 receives a selection of an enhancement. In an example, the user of the visualization device 102 may view a particular room of the property and select enhancement options. In an example, enhancement options may relate to new flooring, cabinetry, countertops, paint colors, sinks, furniture, fireplaces, and wallpaper patterns, among others.

In some embodiments, the enhancement engine 104 may receive such enhancement options from one or more third party data sources 108, which may include, for example, appliance stores, contractors, and home improvement stores, among others. Accordingly, such third party data sources 108 may provide the enhancement engine 104 operating on the visualization device 102 with one or more images that show how the enhancement will look based on a selected enhancement option.

In an example, the user may have the option to select the store or contractor from which the particular enhancement options may be purchased. Alternatively or additionally, the enhancement engine 104 may automatically select one or more manufacturers or stores from which to obtain enhancement options. In such an embodiment, the enhancement engine may select providers (e.g., appliance stores, contractors, home improvement stores, etc.) that are local to the user or the property. In such an embodiment, a global position system (GPS) of the visualization device 102 may be used to determine the location. Alternatively or additionally, non-local stores may also be used (e.g., online retailers).

In some embodiments, the enhancement engine 104 may query one or more of the third party data sources 108 to request image information corresponding to one or more enhancement options selected by the user. In some embodiments, the enhancement engine 104 may display the one or more images of the enhancements as an overlay to the room the user is viewing through the device.

In some embodiments, the enhancement engine 104 may generate enhancement options to the user so that the user may select the category and type of enhancement option. For example, the enhancement engine 104 may provide a user interface such that the user may select the room in a home to visualize and associated enhancement options. In some embodiments, the enhancement engine 104 may provide the user with options based on the particular room selected. For example, if the kitchen is selected, the enhancement engine 104 may provide options for cabinets, countertops, sinks, fixtures, flooring, and backsplash enhancements, among others. In another example, if a bedroom is selected, the enhancement engine 104 may provide options for flooring, paint, wallpaper, and curtains, among others.

In operation 506, the enhancement engine 104 may obtain pricing information from the one or more third party data sources 108 based on the selected enhancement option. In some embodiments, the enhancement engine 104 obtains the lowest price from one or more third party data sources 108. In other embodiments, the enhancement engine 104 receives the price based on a selection of a particular store or manufacturer that offers the particular enhancement option selected in operation 504. In some embodiments, the enhancement engine 104 may further obtain cost information of labor to install the enhancement option. In some embodiment, the cost of associated taxes of the material and labor may also be obtained. Tax information may be generated based on the user's location or address of the home. Permitting information, code compliance, and associated fees may also be obtained or estimated.

In operation 508, the enhancement engine 104 generates a financial analysis. In an example, generating the financial analysis may involve subtracting the total cost of the one or more enhancement options selected by the user (as obtained in operation 506) from the user's enhancement budget (as obtained in operation 502). Thus, the generated financial analysis illustrates the financial effect of the selected enhancement options as it relates to the user's financial information. Alternatively or additionally, the enhancement engine 104 may generate additional financial analysis such as, for example, down payment information, monthly payment options (taking into consideration the user's budget and credit). In further embodiments, in generating the financial analysis, the enhancement engine 104 may also determine one or more credit options available to the user, as offered by a financial institution from which the user may be a member. In some embodiments, the enhancement engine 104 may only identify credit options for which the user is pre-approved. Alternatively or additionally, the enhancement engine 104 may identify credit options for which the user is not pre-approved.

Additionally, generating the financial analysis may involve generating or obtaining one or more of the information rendered in the analysis view 320. In some examples, this may be based on information obtained or generated by the artificial intelligence engine 114.

In operation 510, the enhancement engine 104 may render, on the display of the visualization device 102, an enhancement view 310, and a financial analysis view 320. As illustrated in FIG. 3, the visualization device 102 may simultaneously render such views such that the user may visualize an enhancement option or a combination of enhancement options and an associated analysis. Accordingly, the enhancement engine 104 may, in operation 510, simultaneously render such views on the display of the visualization device 102.

In operation 512, the enhancement engine 104 determines whether another enhancement option is selected. If yes, the method 500 flows to operation 506 in which pricing information corresponding to the selected enhancement option is obtained. If no, the method 500 ends and the user may explore the rendered environment and its financial effects.

Figure 6:
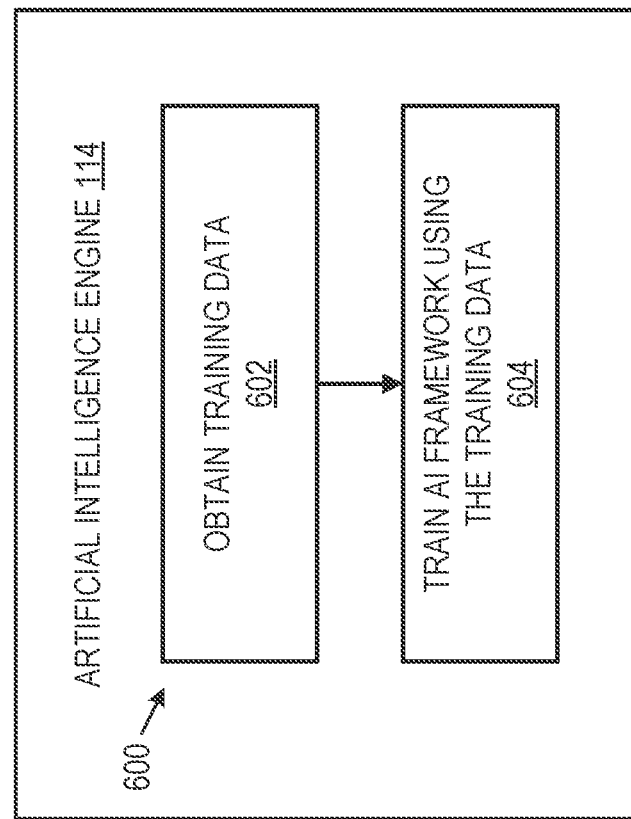
FIG. 6 illustrates an example process that may be used by the artificial intelligence engine to train an artificial intelligence framework using training data.

FIG. 6 illustrates an example process 600 that may be used by the artificial intelligence engine 114 to train the artificial intelligence framework using training data to provide functionality described herein. The process 600 may begin with operation 602, which involves obtaining training data. The training data can be obtained from a variety of different sources including but not limited to the third party data sources 108. For example, the training data may include one or more of local real estate market data, maintenance data, government data, and property owner property preference data, and design data, among other data. Using such data, the artificial intelligence framework 112 can be trained to produce an output based on the training data.

Next, the process 600 can move to operation 604, which involves training the artificial intelligence framework using the training data. This can involve running the training data through the artificial intelligence framework to train it. The artificial intelligence framework 112 can be trained to produce a variety of different kinds of output. For example, the framework 112 can be trained to produce an indication of whether a particular enhancement is recommended based on a variety of different factors, including but not limited to current or predicted future trends, whether potential property buyers would like a particular enhancement, whether particular unique factors for a property are likely to increase or decrease the value of the property, happiness factors for a particular enhancement, projected lifespans for current property features or enhancements, projected value over time for particular enhancements, how particular enhancements factor into other properties in the area, whether particular enhancements fit a user's preferences, and whether it is timely for a particular enhancement to be taken. Once trained, the artificial intelligence framework 112 can be used to provide output based on input. Not all artificial intelligence frameworks need to be trained prior to use.

Figure 7:
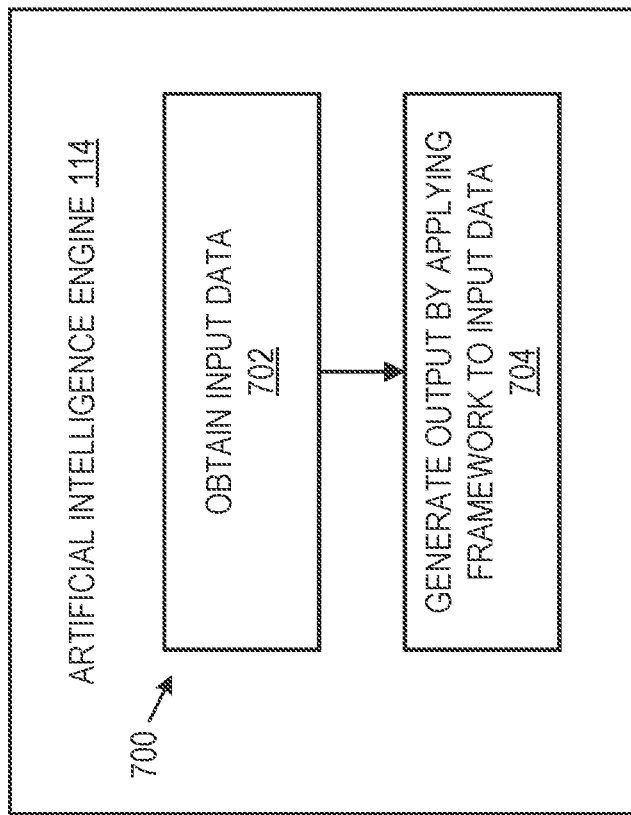
FIG. 7 illustrates an example process that involves using an artificial intelligence engine to generate an output based on an artificial intelligence framework and input data.

FIG. 7 illustrates an example process 700 that involves using the artificial intelligence engine 114 to generate output based on an artificial intelligence framework and input data. The process 700 can begin with operation 702, which involves obtaining input data. The input data may be obtained from a variety of different sources. For instance, the enhancement engine 104 may provide input data to the artificial intelligence engine 114 for providing to the artificial intelligence framework 112. The input data can take a variety of different forms and may be based on how the particular artificial intelligence framework 112 is trained. For example, the input data may take the form of a particular property enhancement (a particular color and material combination scheme for a kitchen backsplash). In some examples, the input data may be obtained directly from the user. For instance, the user may indicate a desire for a particular enhancement via the visualization device 102. In another example, the enhancement engine 104 or the server 110 may proactively monitor third-party data sources 108 for particular enhancement trends and then apply the particular trends to the artificial intelligence framework 112 to determine if they are appropriate or applicable to the user's property.

Next, in operation 704, this input data can be used to generate output by applying the artificial intelligence framework 112 to the input data obtained in operation 702. The output may take a variety of different forms. In some examples the output may be a simple Boolean representing whether or not a particular enhancement is recommended. In some examples, the output is a value indicating a relative desirability of a particular enhancement for a given real estate market, in some examples the value may indicate a relative timeliness of a particular enhancement, in indication of whether or not a property with the particular enhancement is likely to sell, in indication of whether or not the user would like the enhancement, and an indication of whether on a property with a particular enhancement is well-positioned within a local real estate market, among others.

The enhancement engine 104 or the artificial intelligence engine 114 may use one or more different kinds of output to make a recommendation to the user regarding whether or not a particular enhancement is recommended. It may also be used to recommend enhancements to the user such as ones that the user had not chosen but may be otherwise applicable to the user. The results can be provided to the enhancement engine 104 for generating an output for the visualization device 102.

Figure 8:
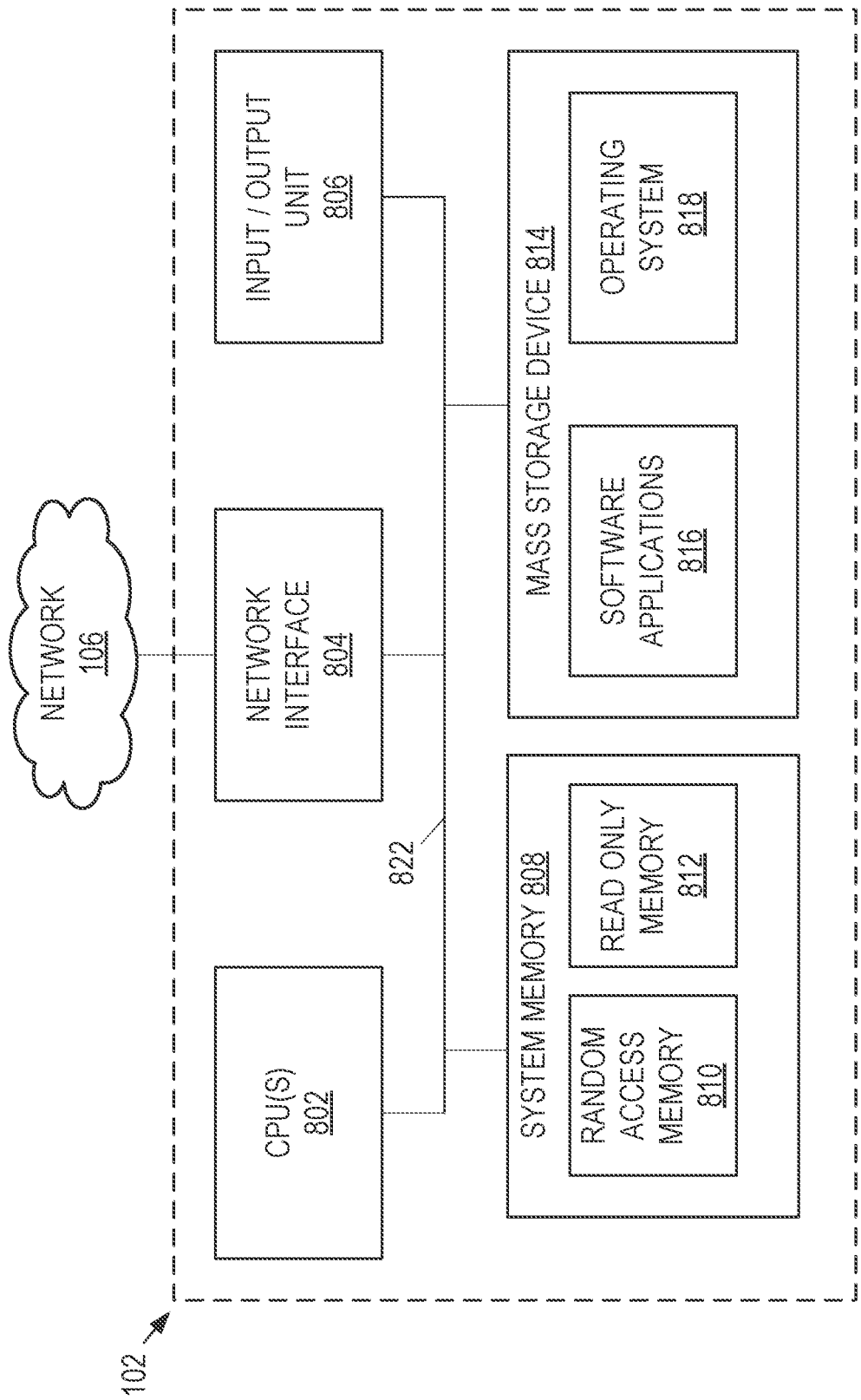
FIG. 8 illustrates example physical components of the visualization device illustrated in FIG. 1.

FIG. 8 illustrates an example of physical components of the visualization device 102 including the enhancement engine 104 illustrated in FIG. 1. The server 110 can also include any or all of the components described below. As illustrated, device 102 includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements with, in the device 102, such as during startup, is stored in the ROM 812. The device 102 further includes a mass storage device 814. The mass storage device 814 is able to store software instructions and data.

The mass storage device 814 is connected to the CPU 802 through a mass storage controller (not shown) connected to the system bus 822. The mass storage device 814 and its associated computer-readable data storage media provide non-volatile, non-transitory storage for the device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, carbon atom memory storage device, or any other medium which can be used to store the desired information and which can be accessed by the device 102.

According to various embodiments of the invention, the device 102 may operate in a networked environment using logical connections to remote network devices through the network 106, such as a wireless network, the Internet, or another type of network. The device 102 may connect to the network 106 through a network interface unit 804 connected to the system bus 822. It should be appreciated that the network interface unit 804 may also be utilized to connect to other types of networks and remote computing systems. The device 102 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the device 102 can store software instructions and data. The software instructions include an operating system 818 suitable for controlling the operation of the device 102. The mass storage device 814 and/or the RAM 810 also store software instructions, that when executed by the CPU 802, cause the device 102 to provide the functionality of the device 102 discussed in this document. For example, the mass storage device 814 and/or the RAM 810 can store software instructions that, when executed by the CPU 802, cause the device 102 to render received data on the display of the device 102.

Although various embodiments described herein involve the use of augmented reality or virtual reality visualization devices, other devices may be used including but not limited to televisions, digital assistant, and smart home devices (e.g., smart speakers), among others. In addition, although many examples were provided showing the systems and methods disclosed herein is being used where the property is a home and where the enhancements are home enhancements, disclosed aspects may be applied in other situations. For example, the property may be a commercial real estate property or a vehicle.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system for displaying enhancement options to a property of a user, the system comprising:
   an augmented reality computing device comprising a processing unit and system memory, wherein the augmented reality computing device is configured to:

recognize an area of the property in an augmented reality view of the property captured by the augmented reality computing device;

using artificial intelligence, analyze local and national property data;

based on the local and national property data analyzed by the artificial intelligence, predict property enhancement trends;

based on the property enhancement trends, present a plurality of property enhancement options on the augmented reality computing device;

receive a user selection of a property enhancement option from the plurality of property enhancement options for the area of the property;

responsive to the user selection,
render an enhanced view of the area augmented with the property enhancement option in the augmented reality view;

obtain pricing information for the property enhancement option;

automatically generate a financial analysis of the property enhancement option based on the pricing information; and render the financial analysis in the augmented reality view.

2. The system of claim 1, wherein the augmented reality computing device is a first augmented reality computing device; and wherein the system comprises a second augmented reality computing device, wherein rendering capabilities of the first augmented reality computing device and the second augmented reality computing device are synchronized via a server or directly over a network.

3. The system of claim 1, wherein the augmented reality computing device is further configured to:
obtain financial data from a server and third party data sources.

4. The system of claim 3, wherein the third party data sources comprise two or more data sources selected from a group consisting of:
a data source associated with a retailer of products for property enhancement;
a data source associated with property enhancement trends;
a data source associated with a real estate market;
a data source associated with a municipality; and
a data source associated with an insurance provider.

5. The system of claim 3, wherein the financial analysis is in part based on the financial data.

6. The system of claim 3, wherein the server comprises a trained artificial intelligence framework, and wherein the financial data obtained from the server comprises output data based on an output of the trained artificial intelligence framework.

7. The system of claim 6, wherein the trained artificial intelligence framework is trained using data from the third party data sources.

8. The system of claim 1, wherein the augmented reality computing device is further configured to modify how the property enhancement option is rendered in augmented reality based on the financial analysis associated with the property enhancement.

9. The system of claim 1, wherein rendering the financial analysis in the augmented reality view includes:
displaying an enhancement budget amount, estimated costs for the property enhancement option to be performed at one or more future time periods and a recommendation regarding when to perform the property enhancement option.

10. The system of claim 1, wherein the augmented reality computing device is further configured to:
render a scene comprising an enhancement view on in the augmented reality view, wherein the enhancement view shows the property with a representation of the property enhancement option depicted thereon.

11. A method for displaying enhancement options to a property of a user using an augmented reality computing device, the method comprising:
recognizing an area of the property in an augmented reality view of the property captured by the augmented reality computing device;
using artificial intelligence, analyzing local and national property data;
based on the analyzing of the local and national property data by the artificial intelligence, predicting property enhancement trends;
based on the property enhancement trends, presenting a plurality of property enhancement options on the augmented reality computing device;
receiving a user selection of a property enhancement option from the plurality of property enhancement options for the area of the property; and
responsive to the user selection:
rendering an enhanced view of the area augmented with the property enhancement option in the augmented reality view;
obtaining pricing information for the property enhancement option;
automatically generating a financial analysis of the property enhancement option based on the pricing information; and
rendering the financial analysis in the augmented reality view.

12. The method of claim 11, wherein the augmented reality computing device is a first augmented reality computing device; and wherein the system comprises a second augmented reality computing device, wherein rendering capabilities of the first augmented reality computing device and the second augmented reality computing device are synchronized via a server or directly over a network.

13. The method of claim 11, further comprising:
obtaining financial data from a server and third party data sources.

14. The method of claim 13, wherein the third party data sources comprise two or more data sources selected from a group consisting of:
a data source associated with a retailer of products for property enhancement;
a data source associated with property enhancement trends;
a data source associated with a real estate market;
a data source associated with a municipality; and
a data source associated with an insurance provider.

15. The method of claim 13, wherein the financial analysis is in part based on the financial data.

16. The method of claim 13, wherein the server comprises a trained artificial intelligence framework, and wherein the financial data obtained from the server comprises output data based on an output of the trained artificial intelligence framework.

17. The method of claim 16, wherein the trained artificial intelligence framework is trained using data from the third party data sources.

18. The method of claim 11, wherein the augmented reality computing device is further configured to modify how the property enhancement option is rendered in augmented reality based on the financial analysis associated with the property enhancement.

19. The method of claim 11, wherein rendering the financial analysis in the augmented reality view includes:
displaying an enhancement budget amount, estimated costs for the property enhancement option to be performed at one or more future time periods and a recommendation regarding when to perform the property enhancement option.

20. The method of claim 11, further comprising:
rendering a scene comprising an enhancement view on in the augmented reality view, wherein the enhancement view shows the property with a representation of the property enhancement option depicted thereon.

\* \* \* \* \*